US010353973B2

(12) United States Patent
Cora

(10) Patent No.: US 10,353,973 B2
(45) Date of Patent: Jul. 16, 2019

(54) DOMAIN RANKING FOR DIGITAL MAGAZINES

(71) Applicant: Flipboard, Inc., Palo Alto, CA (US)

(72) Inventor: Vlad Ionut Cora, Burnaby (CA)

(73) Assignee: Flipboard, Inc., Palo Alto, CA (US)

( * ) Notice: Subject to any disclaimer, the term of this patent is extended or adjusted under 35 U.S.C. 154(b) by 308 days.

(21) Appl. No.: 15/242,260

(22) Filed: Aug. 19, 2016

(65) Prior Publication Data

US 2018/0052936 A1 Feb. 22, 2018

(51) Int. Cl.
*G06F 7/04* (2006.01)
*G06F 16/00* (2019.01)
*G06F 16/9535* (2019.01)
*G06N 7/00* (2006.01)
*G06F 16/335* (2019.01)
*G06F 16/33* (2019.01)

(52) U.S. Cl.
CPC ........ *G06F 16/9535* (2019.01); *G06F 16/335* (2019.01); *G06F 16/3346* (2019.01); *G06N 7/005* (2013.01)

(58) Field of Classification Search
CPC ........ G06F 17/30867; G06F 17/30687; G06F 17/30699; G06F 16/3346; G06F 16/335; G06F 16/9535; G06F 16/9538; G06N 7/005
See application file for complete search history.

(56) References Cited

U.S. PATENT DOCUMENTS

| 2007/0250468 | A1* | 10/2007 | Pieper | G06F 17/3089 |
| 2012/0233096 | A1* | 9/2012 | Gupta | G06F 17/30864 706/12 |
| 2013/0086083 | A1* | 4/2013 | Zou | G06F 16/951 707/749 |
| 2014/0004892 | A1* | 1/2014 | Murynets | H04W 4/14 455/466 |
| 2015/0100587 | A1* | 4/2015 | Walkingshaw | G06F 17/30873 707/748 |
| 2015/0213131 | A1* | 7/2015 | Styler | H04L 61/1511 707/767 |
| 2016/0148612 | A1* | 5/2016 | Guo | G06F 17/27 704/257 |

* cited by examiner

Primary Examiner — Bruce M Moser
(74) Attorney, Agent, or Firm — Fenwick & West LLP

(57) ABSTRACT

A digital magazine server displays content items from various sources to users of client devices. Each source of a content item is identified by a domain, and content items for different sources have different domain-level quality. To differentiate sources of content items, the domains identifying the sources are ranked based on domain scores of the domains generated by an aggregate of multiple trained domain classifiers. A domain score of a domain indicates a domain-level quality of content items provided by a source identified by the domain. Each of the trained domain classifiers (e.g., a naïve Bayes classifier, a random forest classifier, and a logistic regression classifier) generates a prediction of whether a domain is a spam domain based on the domain features and domains with known labels. Based on the domain scores of domains, the domain ranking module may adaptively select content items from the sources with corresponding domains scores.

16 Claims, 5 Drawing Sheets

DOMAIN RANKING FOR DIGITAL MAGAZINES

BACKGROUND

This disclosure relates generally to digital content publishing, and more specifically to ranking domains of sources of digital content for digital magazines using trained domain classifiers.

Digital distribution channels disseminate a wide variety of digital content including text, images, audio, links, videos, and interactive media (e.g., games, collaborative content) to users. Users often interact with content items provided by various sources or content providers, such as social networking systems, online publishers and blogs. A content item provided by a source is often based on the content of a resource on the Internet identified by a universal resource locator (URL). A part of the URL for the content item is a domain name, which is a text-based label and serves to identify the source of the content item. For example, an article on Internet located at URL: http://www.example.net/index.html, is related to the domain name "example.net," which identifies the source of the article.

Content items available for users to view in digital magazines are not immune to online spamming, where unsolicited articles or messages (also known as "spam") are provided by spammers using various domain names. For example, 48-hour data collected by a digital magazine service, FLIPBOARD™, show that there are 228,884 new articles from 39,620 domains, where at least 23% of the new articles are spam, and about 7-11% articles are from known spam domains. Existing techniques to identify spam domains include manual identification and spam identification at content item level (e.g., during the processing of content items). However, manually identifying spam domains or identifying spam domains at content item level are slow and costly, which degrades user experience with consumption of the content items provided by digital magazines.

SUMMARY

A digital magazine is a personalized, customizable application for displaying content items from a various sources to a user of a client device (e.g., a mobile communication device, tablet, computer, and any other suitable computing system). Each source of a content item is identified by a domain, and content items for different sources have different domain-level quality. For example, a source identified by a spam domain is more likely to provide unsolicited articles (or spams), while a source identified by a whitelisted domain is more likely to provide high quality content items for publishing on digital magazines.

To differentiate sources of content items, the domains identifying the sources are ranked based on domain scores of the domains by a digital magazine server. A domain score of a domain indicates a domain-level quality of content items provided by a source identified by the domain. A domain ranking module of the digital magazine server extracts domain features from content items of digital magazines based on user interactions with the content items. A domain feature associated with a domain describes one characteristic of the domain. Examples of domain features include average click through rate, average length, vocabularies (e.g., frequently used keywords) used in the content items, user comments (e.g., likes and dislikes) on content items, and social signals of the content items from user interaction (e.g., number of shares, likes, comments and flips). The domain features are used to train domain classifiers.

The domain features of the content items are analyzed by multiple trained domain classifiers, e.g., a naïve Bayes classifier trained using naïve Bayes technique with domain training data, a random forest classifier trained using random forest technique with the domain training data, and a logistic regression classifier trained using logistic regression technique with the domain training data. Each of the trained domain classifiers generates a prediction, e.g., a probability between 0 and 1, of a domain being a spam domain based on the domain features extracted from content items and domains with known labels. Using multiple domain classifiers improves overall accuracy of spam domain detection over a single domain classifier, e.g., allowing different weights to be applied to different classifiers (e.g., 1.5 to random forest classifier and 0.7 to naïve Bayes classifier and logistic regression classifier) and identifying and limiting influence of rare/outlier domain features in the domain classification.

The domain ranking module generates a domain score for each domain of content items being processed based on the probability of the domain from each of the three domain classifiers. For example, the domain ranking module generates a domain score for a domain by calculating a weighted average of the probabilities of the domain multiplied by the standard deviation among the three domain classifiers. Based on the domain scores of domains, the domain ranking module may adaptively select content items from the sources with corresponding domains scores. For example, the domain ranking module may block content items from sources that are spam domains; increase numbers of content items selected from sources having high domain scores, or penalize sources having low domain scores. The selected content items are presented by the digital magazine server via digital magazines to users.

DETAILED DESCRIPTION

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

Example Digital Magazine System Environment

A digital magazine is a personalized, customizable application for displaying content items to a user of a client device (e.g., a mobile communication device, tablet, computer, and any other suitable computing system). For example, a digital magazine server selects content items from various sources for presentation to a user based on the user's interests and preferences. The content items are sent with instructions for display to the user on a client device. The generated digital magazine is retrieved by a digital magazine application executing on the client device and presented to the user. The generated digital magazine allows the user to more easily view digital content by presenting content items in an easily navigable interface via the client device.

One embodiment of a disclosed configuration is a computer system (or a computer implemented method or a non-transitory computer readable medium) for ranking domains associated with sources of articles of digital magazines and identifying spam domains based on the ranking. A "digital magazine" herein refers to an aggregation of digital content items that can be presented to users in a presentable format similar to the format used by print magazines. In one embodiment, a digital magazine assembles a list of universal resource locators (URLs), where each article of the digital magazine is based on the content of a resource on the Internet identified by a corresponding URL of the list of the URLs. A "content item" or "article" herein refers to any machine-readable and machine-storable work product, such as textual articles, pictures, images, videos, user-generated content (e.g., content posted on a social networking system or content items locally stored in a local memory of a computing device used by the user), advertisements, and any other types of digital content capable of display within the context of a digital magazine.

Figure 1:
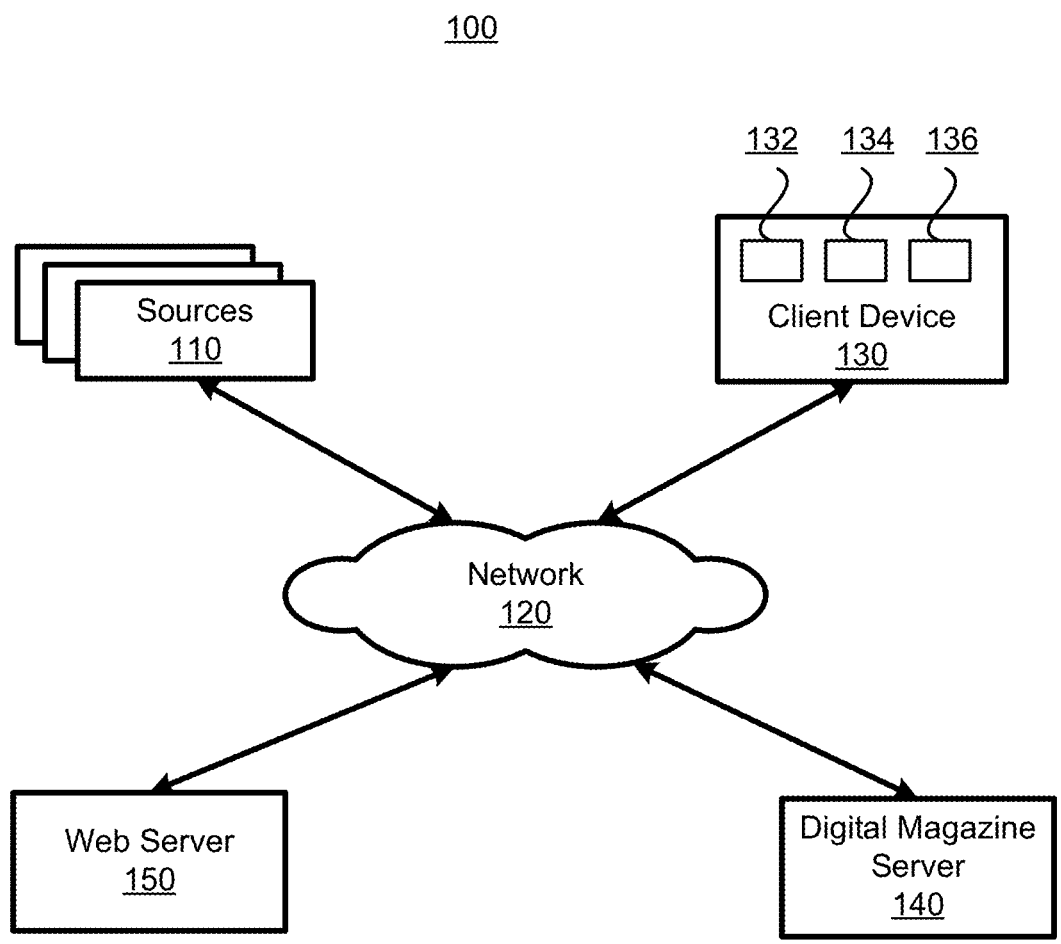
FIG. 1 is a block diagram of a system environment in which a digital magazine server operates according to one embodiment.

FIG. 1 is a block diagram of a system environment 100 in which a digital magazine server 140 operates according to one embodiment. The system environment 100 shown in FIG. 1 includes one or more sources 110, a network 120, a client device 130, the digital magazine server 140 and a web server 150. In alternative configurations, different and/or additional components may be included in the system environment 100. The embodiments described herein can be adapted to online systems that are not digital magazine servers 140.

A source 110 is a computing system capable of providing various types of content to the client device 130 and the digital magazine server 140. In one embodiment, a content item provided by a source 110 is based on the content of a resource on the Internet located at a place described by a URL, and the source 110 for the content item is identified by a domain name embedded with the URL. Examples of content provided by a source 110 include text, images, video, or audio on web pages, web feeds, social networking information, messages, or other suitable data. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120. The network 120 may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 130 is a computing device capable of receiving user input as well as transmitting and/or receiving data via the network 120. Various embodiments of the client device 130 include a conventional computer system, such as a desktop or a laptop computer, and a device having computer functionality, such as a personal digital assistant (PDA), a mobile telephone, a smartphone or another suitable device. In one embodiment, the client device 130 executes a digital magazine application allowing a user of the client device 130 to interact with the digital magazine server 140. For example, the digital magazine application executing on the client device 130 communicates instructions or requests for content items to the digital magazine server 140. The client device 130 also executes a browser that receives pages from the digital magazine server 140 and presents the pages to a user of the client device 130. In another embodiment, the client device 130 interacts with the digital magazine server 140 through an application programming interface (API) running on a native operating system of the client device 130, such as IOS® or ANDROID™. While FIG. 1 shows a single client device 130 for simplicity, in various embodiments, any number of client devices 130 may communicate with the digital magazine server 140.

Different client devices 130 may have different characteristics such as different processing capabilities, different connection speeds with the digital magazine server 140 over the network 120, and different device types (e.g., make, manufacture, and version). For example, in one embodiment, a client device 130 includes a display device 132, an input device 134 and a data storage 136. A display device 132 included in the client device 130, e.g., a liquid crystal display (LCD), an organic light emitting diode (OLED) display, an active matrix liquid crystal display (AMLCD), presents content items to a user of the client device 130.

An input device 134 included in the client device 130, e.g., a touch-sensitive display, a touchless interface (e.g., digital sensors, image capture device), receives input from a user of the client device 130, e.g., a search query, a selected color or story. The user input is processed by a digital magazine application executing on the client device 130 to allow the user to interact with content items presented by the digital magazine server 140.

The data storage 136 included in the client device 130, e.g., a tangible computer readable storage medium or any type of storage medium suitable for storing electronic instructions, stores a user's own content items such as photos/images, video files or audio files, text of a user's blogs, tweets, shared images, video or audio, social networking posts. The content items locally stored in the data storage 136 of the client device 130 can be selected by the user to create a personalized digital magazine, which includes the user selected local content items.

The web server 150 is a computer system that process requests based on network protocols, e.g., HTTP. In one embodiment, the web server 150 links the digital magazine server 140 via the network 120 to the client device 130, as well as to the one or more sources 110. The web server 150 serves web pages as well as other digital content to the digital magazine server 140 and communicates instructions to the client device 130 for generating pages of content items in a suitable presentation style/format for presentation to a user of the client device 130. In the embodiment shown in FIG. 1, the web server 150 is a network entity separate from the digital magazine server 140. In other embodiments, the web server 150 is a component of the digital magazine server 140.

The digital magazine server 140 receives content items from one or more sources 110 or provided by users of the digital magazine server 140, identifies the domain names associated with sources of the content items, extract features from the received content items, applies trained domain classifiers to the extracted domain features and generates a domain score for each identified domain. A domain score of a domain represents a prediction of whether the domain is a spam domain. Based on the domain scores associated with the domains, the digital magazine server 140 ranks the domains. The digital magazine severs 140 updates content selection from sources identified by the domains based on the domain ranking. For example, the digital magazine server 140 blocks content items from a source identified by a domain with a domain score lower than a threshold for spam domains, which indicates that the domain is likely a spam domain. On the other hand, the digital magazine server 140 may boost selection of content items from sources identified by domains with high domain scores, e.g., increasing number of content items from such sources for publishing. From the selected content items, the digital magazine server 140 generates pages in digital magazines and provides the pages to the client device 130 or provides instructions to the client device 130 to generate pages in digital magazines.

Example Digital Magazine Server and Domain Ranking

Figure 2:
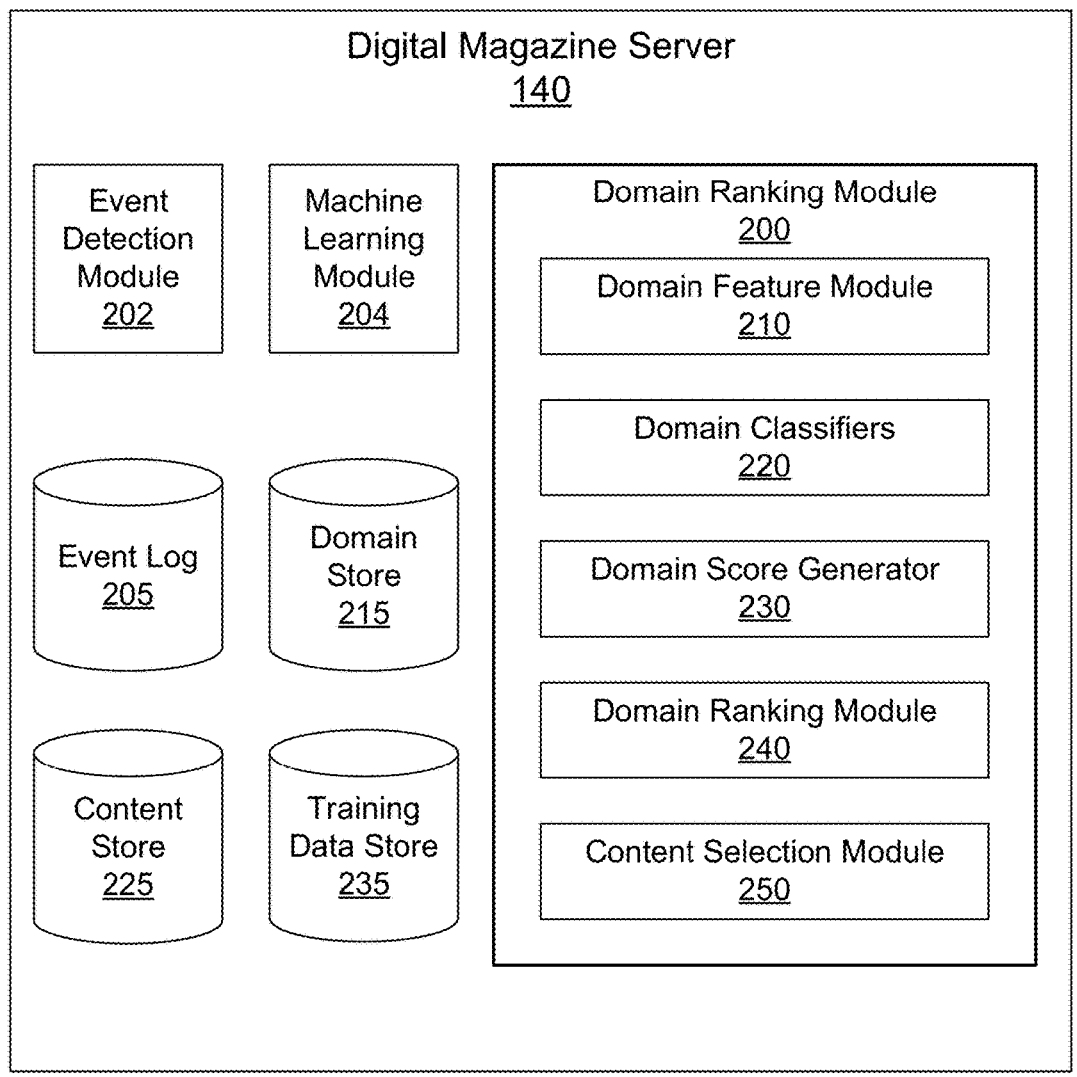
FIG. 2 is a block diagram of a digital magazine server for domain ranking according to one embodiment.

FIG. 2 is a block diagram of a digital magazine server 140 according to one embodiment. The digital magazine server 140 shown in FIG. 2 includes an event detection module 202, a machine learning module 204, a domain ranking module 200, an event log 205, a domain store 215, a content store 225, and a training data store 235. In other embodiments, the digital magazine server 140 may include additional, fewer, or different components for various applications. In the embodiment shown in FIG. 2, the domain ranking module 200 includes a domain feature module 210, domain classifiers 220, a domain score generator 230, a domain ranking module 240 and a content selection module 250.

The event detection module 202 detects user interactions with content items displayed on pages of digital magazines on client devices 150. For example, the event detection module 202 monitors the content items displayed on a page of a digital magazine on a client device 150 and user interactions with the displayed content items. Users may interact with various digital content items on digital magazines provided by the digital magazine server 140, and the event detection module 202 stores information describing these interactions in the event log 205. Examples of interactions with content items include: commenting on an article, sharing links, accessing content items, flipping, dragging, or resizing a page of a digital magazine, expressing a preference for a content item ("liking" the content item) and other types of interactions.

The event log 202 stores user interactions with content items of digital magazines. For example, for each user interaction, the event log 202 stores a description of an interaction with a content item by a user, a content item identifier, a domain name of the source of the content item and a time of the interaction. In some embodiments, data from the event log 202 is used to identify domain names of sources of the content items. In some other embodiment, data from the event log 202 is to infer interests or preferences of users of the digital magazines, allowing a more complete understanding of user preferences. For example, content items a user previously interacted with may be retrieved by the digital magazine server 140 using the content item identifiers, allowing the digital magazine server 140 to recommend content items to the user based on content items with which the user previously interacted.

The content store 225 stores objects that represent various types of digital content items. In one embodiment, the objects are URLs, each of which references to a resource on the Internet. For example, the content store 225 stores content items received from one or more sources 110 (e.g., the sources identified by the domain names in the URLs) within a threshold time of a current time, e.g., 6 months. Examples of content items stored by the content store 225 include page posts, status updates, photographs, videos, links, news articles, audios, or any other types of content.

The domain store 215 stores domain names associated with sources of content items curated by the digital magazine server 140. In one embodiment, the digital magazine server 140 extracts domain names from the URLs of the content items, e.g., by parsing the URLs. For example, the digital magazine server 140 parses a URL using API calls, e.g., /api/v1/domain?url=< >&url=< >. Each domain name is associated with a source of one or more content items; each domain name has a label indicating a type of the domain. Examples of domain label include:
{
 −1: spam domain;
 0: unlabeled domain;
 1: major partner domain;
 2: minor partner domain;
 3: whitelisted domain.
}

In one embodiment, the domain store 215 is portioned to two parts: one for storing domains with known labels, which are used by the machine learning module 204 to train domain classifiers; the other for storing domains whose labels are to be learned by the trained domain classifiers. To simplify the training of the domain classifiers, the domains with known labels are grouped into two classes: −1 for spam domains and 1 for non-spam domains including major partner domains, minor partner domains and whitelisted domains.

The machine learning module 204 trains various domain classifiers 220 with domain training data stored in the training data store 235. In one embodiment, the machine learning module 204 uses machine learning techniques including, but not limited to, random forest, naïve Bayes, and logistic regression, to train the domain classifiers 220. For example, the machine learning module 204 trains a domain classifier using random forest technique with the domain training data by building multiple decision trees at training time with the domain train data and outputs a probability of a domain being a spam domain. Similarly, the machine learning module 204 trains a domain classifier using logistic regression technique, e.g., a cumulative logistic distribution function, with the domain training data by estimating a probability of a domain being a spam domain based on the domain features extracted from content items. The machine learning module 204 further trains a domain classifier using naïve Bayes technique, e.g., correlating domain features associated with spam domains and domain features associated with non-spam domains, to calculate a probability of a domain being a spam domain.

In one embodiment, the machine learning module 204 store the trained domain classifiers 220, e.g., a random forest domain classifier, a naïve Bayes domain classifier and a logistic regression domain classifier, in the digital magazine server 140 and periodically re-train the domain classifiers using features based on updated training data. The domain score generator 230 generates a domain score for a domain based on the predictions of the domain by the trained domain classifiers 220.

In one embodiment, the domain training data used by the machine learning module 204 includes domains with known labels (e.g., similar or same as the domains with known labels stored in the domain store 215) and domain features extracted from the content items interacted by users of digital magazines by the domain feature module 210. For example, the domain training data stored in the training data store 235 includes about 160 million articles, 4 million domains associated with articles in the past 2 years curated by the digital magazine server 140, and 3600 domains with known labels.

The domain feature module 210 obtains domain features from content items interacted by users of digital magazines. Example domain features from content items used in domain classifiers training include:

{
  avg_ctr: average click through rate;
  avg_length: average length;
  avg_lexical_diversity: a measurement of vocabulary richness;
  avg_likes_ratio: ratio of likes to dislikes;
  avg_nsfw_count: percentage of content items that are tagged Not Safe For Work (e.g.,
    pornography, inflammatory content, etc.);
  avg_quickbacks: percentage of views with less than 10% completion;
  avg_satisfaction: average of social signals (e.g., shares, likes, comments, flips) over views;
  avg_spew: a measure of publishing acceleration, to capture new spam domains.
}

Additional domain features include: avg_doc_velocity (a ratio of number of published articles over publishing age, which is number of days between the oldest article and the newest article); avg_popularity (a popularity measurement of the content items with the readers); avg_percent_complete (percentage of views in completion), domain information generated from "whois" queries and responses to databases storing Internet resources, such as database of domain names, and any other suitable features associated with content items of digital magazines.

In one embodiment, the domain feature module 210 obtains the domain features described above by aggregating various features associated with the content items stored in the content store 225 in view of the user interactions with the content items stored in the even log 205. For example, the domain feature module 210 obtains domain feature average click through rate, avg_ctr, using Equation (1) below:

$$\text{avg\_ctr} = \frac{\text{sum\_doc[bayesian\_average}(\min(\text{views}, 0.5*\text{displays})/\text{display})]}{\text{doc\_count}} \quad (1)$$

where parameter doc_count represents total number of content items, parameter views represents total of number of views of the content items by users, and parameter displays represents total number of displays of the content items to the users. For another example, the domain feature module 210 obtains domain feature average like to dislike ratio, avg_like_ratio, and domain feature avg_spew, using Equation (2) and Equation (3), respectively, below $$\text{avg\_like\_ratio} = \frac{\text{sum\_doc[bayesian\_average}(\text{likes}/(\text{likes}+\text{dislikes}))]}{\text{doc\_count}} \quad (2)$$

$$\text{avg\_spew} = \frac{\log(1+\text{avg\_doc\_velocity})}{\log(1+\text{publishing\_age})} \quad (3)$$

where avg_doc_velocity=(doc_count/publishing_age) and parameter publishing_age is number of days between the oldest article and the newest article among the content items.

For a domain associated with one or more content items, each of the trained domain classifiers 220 generates a prediction of how likely the domain is a spam domain based on the domain features associated with the content items. The domain score generator 230 generates a domain score for a domain based on the predictions of the domain by the trained domain classifiers 220. In one embodiment, the domain score generator 230 remaps the probability (0, 1) generated by the domain classifiers to a score between (−1, 1), where a domain score of −1 indicates that the corresponding domain is a spam domain; a domain score around 0 indicates uncertainty in the prediction that the corresponding domain is a spam domain; a domain score closer to 1 represents that the corresponding domain is more likely to provide high quality content items free of spam than a domain having a domain score far away from 1.

In one embodiment, the domain score generator 230 generates a domain score for a domain using Equation (4) below:

$$\text{domain\_score} = \text{score}*(1-\text{score\_confusion}^2) \quad (4)$$

where $$\text{score} = \frac{(1.5*RF + 0.7*NB + 0.7*LR)}{3(1.5+0.7+0.7)}$$

and score_confusion=min(1,std(RF,NB,LR)). Parameter RF, NB, and LR, presents the probability of the domain being a spam predicted by the random forest domain classifier, the naïve Bayes domain classifier and the logistic regression domain classifier, respectively; the constants applied to each domain classifier represents weights associated with corresponding domain classifiers. std (RF, NB, LR) represents the standard deviation among the probabilities of the domain predicted by these three domain classifiers, where std (RF, NB, LR)>0.5 indicates disagreement among the three domain classifiers and uncertainty in the domain score for the domain. For example, the probability result (0, 1) from each classifier is remapped to a score of (−1, 1) though a linear interpolation, then weighted averaged together. The remapping is furthered aided by a measure of disagreement among the classifiers, score_confusion. If one classifier has positive value, and another classifier has negative value, the averaged score is pushed toward 0, which indicates confusion or disagreement. Additionally, multiplying score_confusion further pushes the score towards 0, which indicates disagreement among the classifiers.

The domain score for a domain can be used in ranking the domain by comparing the domain score of the domain with domain scores of other domains, where a domain with a higher domain score ranks higher than a domain with a lower domain score. A domain having a higher domain score is likely to provide better quality content items than a domain having a lower domain score. In one embodiment, the domain ranking module 240 ranks the domains based on their corresponding domain scores and order the domains, e.g., from the highest domain score to the lowest domain score.

Based on domain scores, the domain ranking module 240 may further identify domains for a whitelist of domains, which is a list of domains names of source 110 known to provide high quality content items to digital magazines. For example, the domain ranking module 240 selects domain scores higher than a predetermined threshold for the whitelist and adds the corresponding domains of the selected domain scores to the whitelist. Similarly, the domain ranking module 240 selects domain scores below another predetermined threshold for a blacklist, e.g., domain score<−0.25, which is a list of domains names of source 110 known to spread spam to digital magazines. Content items from a source 110 whose domain name is on the blacklist are blocked by the digital magazine server 140 for publishing in digital magazines.

The content selection module 250 adaptively selects content items from sources 110 in view of the domain scores of the sources 110. In one embodiment, the content selection module 250 may block, boost or penalize sources 110 depending on their corresponding domain scores. For example, the content selection module 250 blocks content items from sources 110 whose domain names are on the blacklist. On the other hand, the content selection module 250 selects more content items from sources 110 whose domain names are on the whitelist than from other sources 110. For sources 110, e.g., major partners and minor partners of the digital magazine server 140, the content selection module 250 may boost the sources 110 by selecting an increased number of content items from the partners, where the increase for a source 110 depends on the corresponding domain score of the source 110. For sources 110 other than partners of the digital magazine server 140 and having relatively low domain scores, the content selection module 250 may penalize the sources 110 by decreasing the number of content items from these sources 110 for publishing in digital magazines. The digital magazine server 140 publishes the selected content items in digital magazines for users.

Figure 3:
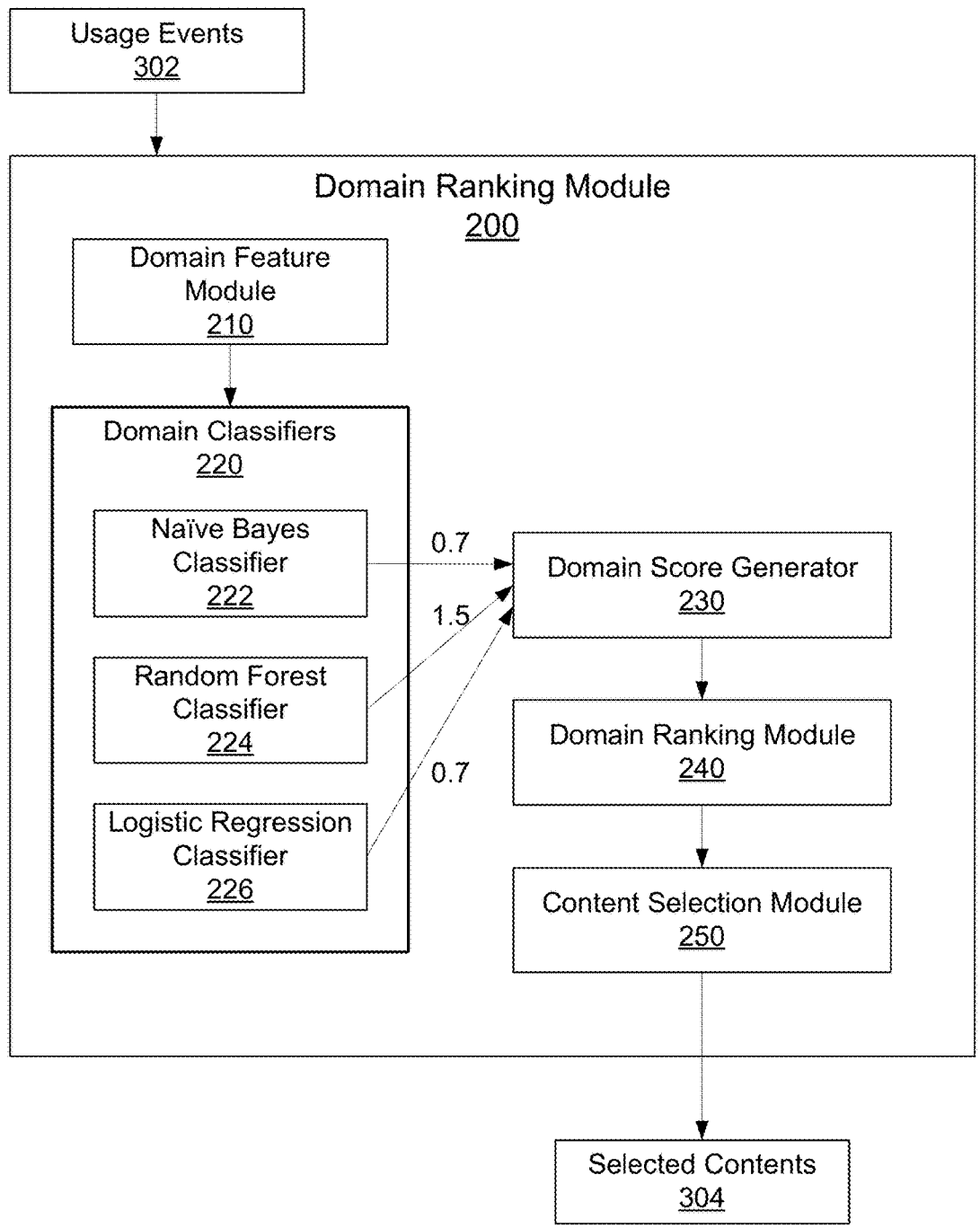
FIG. 3 is a flow diagram of a domain ranking module for ranking domains associated with article usage events according to one embodiment.

FIG. 3 is a flow diagram of a domain ranking module 200 for ranking domains associated with article usage events according to one embodiment. Users interact with content items/articles of digital magazines provided by the digital magazine server 140. User interactions with the content items are detected as usage events 302 by the digital magazine server 140, e.g., by the event detection module 202 shown in FIG. 2. Each usage event has information describing the user interaction with a content item, e.g., a domain name of the source of the content item and time of the interaction.

The detected usage events are received by the domain feature module 201, which extracts domain features from the content items. Examples of domain features include average click through rate, average length, vocabularies (e.g., frequently used keywords) used in the content items, user comments (e.g., likes and dislikes) on content items, and social signals of the content items from user interaction (e.g., number of shares, likes, comments and flips). The domain features are stored in the training data store 235 to train domain classifiers.

The domain features of the content items are analyzed by multiple trained domain classifiers 220, e.g., a naïve Bayes classifier 222 trained using naïve Bayes technique with domain training data, a random forest classifier 224 trained using random forest technique with the domain training data, and a logistic regression classifier 226 trained using logistic regression technique with the domain training data. Each of the trained domain classifier generates a prediction, e.g., a probability between 0 and 1, of a domain being a spam domain based on the domain features extracted from content items and domains with known labels. Using multiple domain classifiers improves overall accuracy of spam domain detection over a single domain classifier, e.g., allowing different weights to be applied to different classifiers (e.g., 1.5 to random forest classifier and 0.7 to naïve Bayes classifier and logistic regression classifier) and identifying and limiting influence of rare/outlier domain features in the domain classification.

The domain score generator 230 generates a domain score for each domain of content items being processed based on the probability of the domain from each of the three domain classifiers 220. In one embodiment, the domain score generator 230 generates a domain score for a domain by calculating a weighted average of the probabilities of the domain with respect to the standard deviation among the three domain classifiers, e.g., using Equation (4) described above. The domain score of a domain represents a domain-level quality of content items provided a source with the corresponding domain. A source having a higher domain score is more likely to provide higher quality content items than a source having a lower domain score.

Based on the domain scores of domains, the content selection module 250 may adaptively selects content items from the sources with corresponding domains scores. For example, the content selection module 250 may block content items from sources that are spam domains; increase numbers of content items selected from sources having high domain scores, or penalize sources having low domain scores. The selected content items 304 are presented by the digital magazine server 140 via digital magazines to users.

Figure 4:
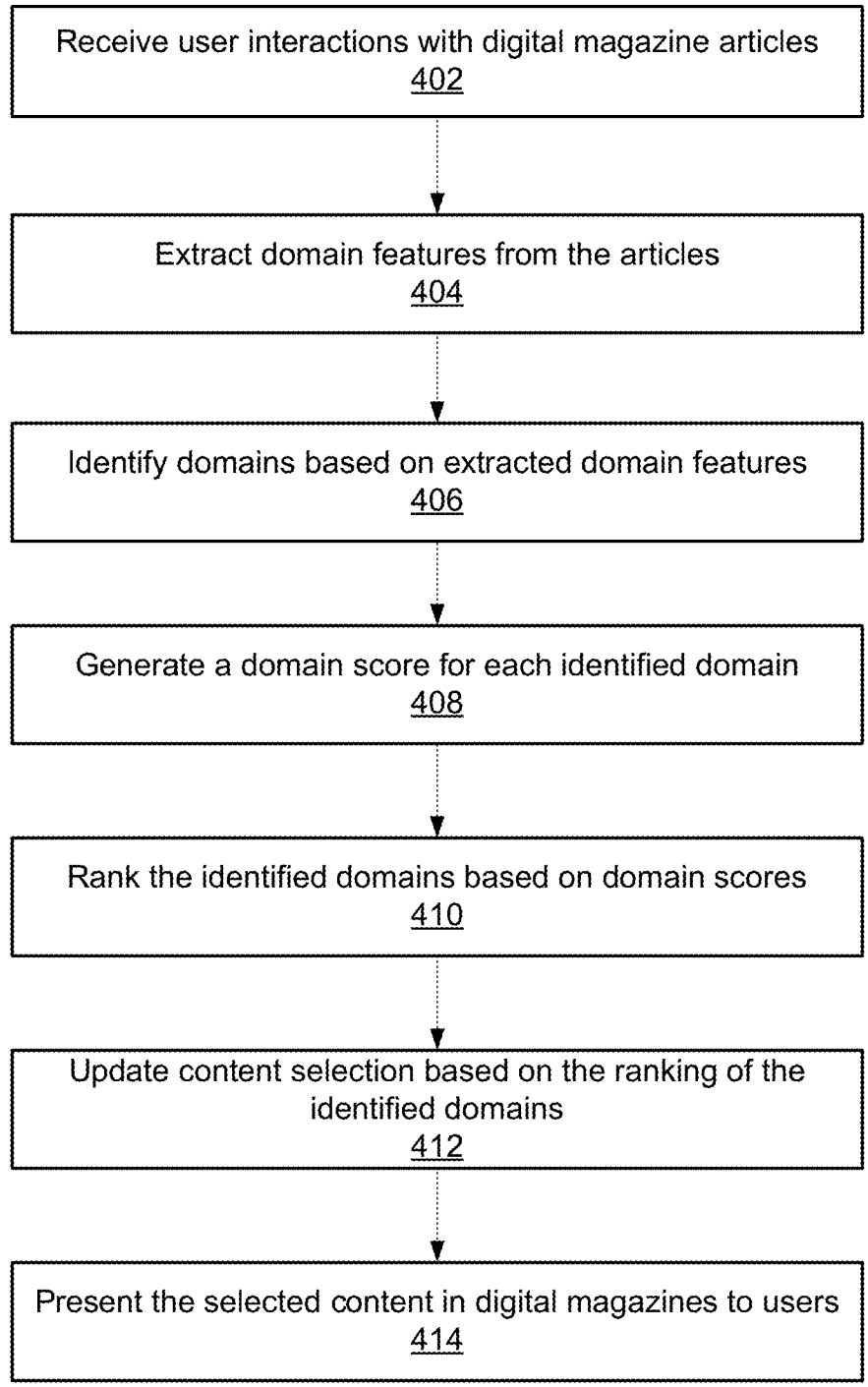
FIG. 4 is a flow chart of a process for ranking domains for digital magazines according to one embodiment.

FIG. 4 is a flow chart of a process for ranking domains for digital magazines according to one embodiment. Initially, the domain ranking module 200 of the digital magazine server 140 receives 403 user interactions with digital magazine articles, and extracts 404 domain features, URLs of the sources providing the content items, from the articles interacted by users of the digital magazines. From the extracted domain features, the domain ranking module 200 identifies 408 domains from the extracted domain features, e.g., parsing the source URLs to get domain names of the sources. The domain ranking module 200 generates 408 a domain score for each identified domain, which is further explained with reference to FIG. 5. The domain ranking module 200 ranks 410 the domains based on their corresponding domain scores and updates 412 content selection from sources based on the domain scores of the domains associated with the sources, e.g., blocking content items from spam domains, increasing content items for publishing from sources with whitelisted domains. The domain ranking module 200 provides the selected content items for the digital magazine server 140 for presenting 414 on digital magazines.

Figure 5:
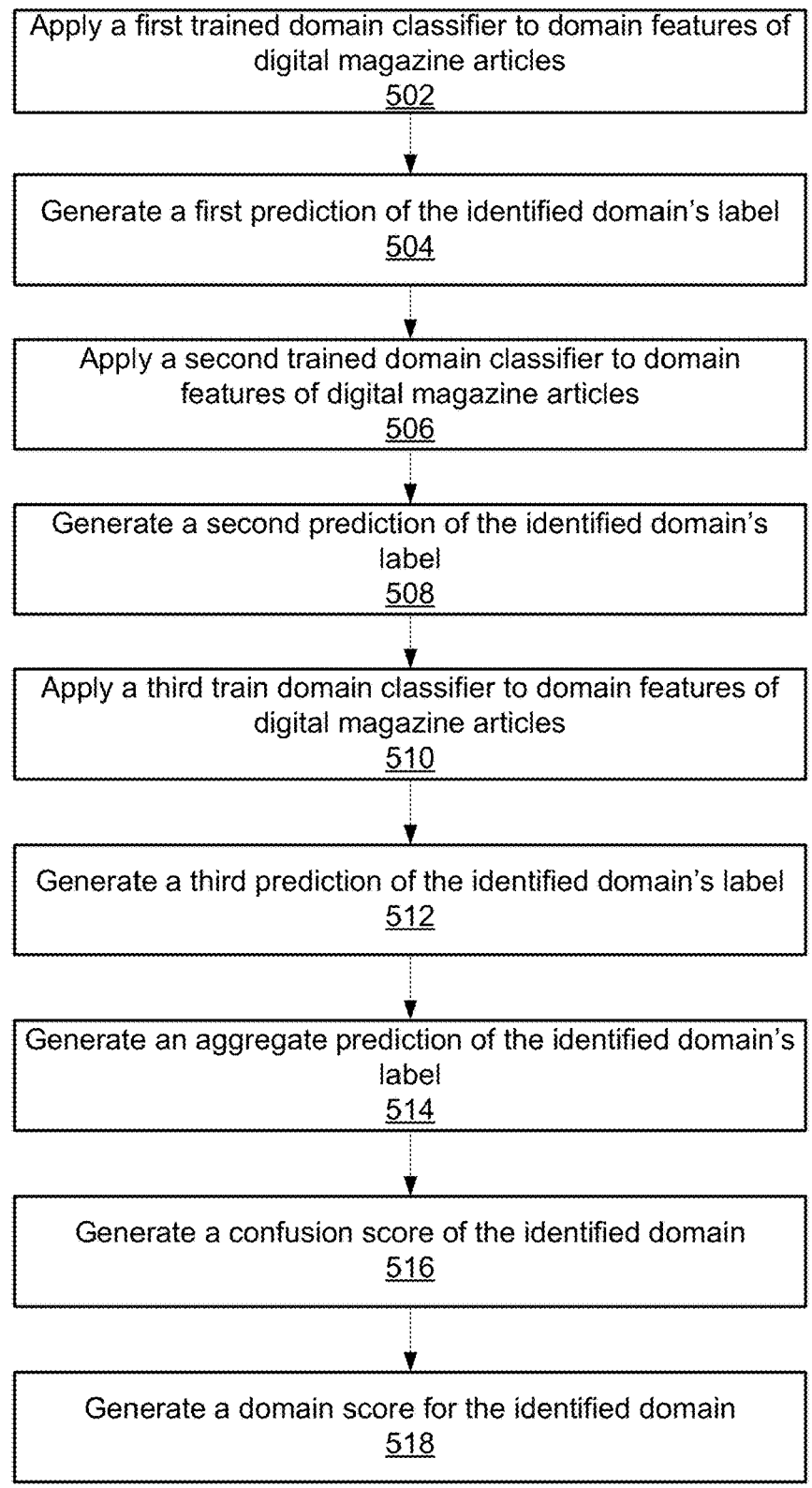
FIG. 5 is a flow chart of a process to generate domain scores used for ranking domains for digital magazines according to one embodiment.

FIG. 5 is a flow chart of a process to generate domain scores used for ranking domains for digital magazines according to one embodiment. In one embodiment, for each domain identified by the domain ranking module 200, the domain score generator 230 of the domain ranking module 200 applies 502 a first trained domain classifier, e.g., a random forest domain classifier, to domain features extracted from the digital magazine articles and generates 504 a first prediction, e.g., a probability between 0 and 1, of the domain that the domain is a spam domain. The domain score generator 230 applies 506 a second trained domain classifier, e.g., a naïve Bayes domain classifier, to the domain features extracted from the digital magazine articles and generates 508 a second prediction of the domain being a spam domain. The domain score generator 230 applies 510 a third trained domain classifier, e.g., a logistic regression domain classifier, to the domain features extracted from the digital magazine articles and generates 512 a third prediction of the domain that the domain is a spam domain.

From the three generated predictions, the domain score generator 230 generates 514 an aggregate prediction of the domain being a spam domain, e.g., an average of a weighted sum of the predictions. The domain score generator 230 further generates 516 a confusion score of the domain, e.g., a standard deviation of the three predictions. Based on the aggregate prediction of the domain and the confusion score of the domain, the domain score generator 230 generates 518 the domain score of the domain, e.g., using the Equation (4) described above. For each of the other identified domains, the domain score generator 230 repeats the steps 502 to 512 to generate a corresponding domain score and provides the generated domain scores to other modules of the domain ranking module 200 for further processing.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method comprising:
receiving a plurality of content items of digital magazines and user interactions with the plurality of content items;
obtaining domain features from the plurality of content items, a domain feature of a content item related to a domain identifying a source of the content item;
identifying one or more domains based on the obtained domain features;
for each identified domain, generating a domain score based on a plurality of predictions of the identified domain by a plurality of trained domain classifiers, a prediction of a domain indicating a likelihood that the domain is a spam domain, and a domain score for a domain indicating a domain-level quality of content items provided by a source identified by the domain, generating the domain score comprising:
applying a first trained domain classifier to a plurality of domain training data;
generating a first prediction of the identified domain being the spam domain;
applying a second trained domain classifier to the plurality of domain training data;
generating a second prediction of the identified domain being the spam domain;
applying a third trained domain classifier to the plurality of domain training data;
generating a third prediction of the identified domain being the spam domain;

generating an aggregate prediction based on the first prediction, the second prediction and the third prediction of the identified domain being a spam domain;

generating a confusion score of the identified domain based on standard deviation of the first prediction, the second prediction and the third prediction of the identified domain being a spam domain; and generating the domain score for the identified domain based on the aggregate prediction of the identified domain and the confusion score of the identified domain; and ranking the identified domains based on domains scores associated with the identified domains.

2. The method of claim 1, wherein the domain features from the plurality of content items comprise at least one of:
average click through rate of the plurality of content items;
average length of the plurality of content items;
a ratio of likes to dislikes of the content items expressed by users of the plurality of content items;
a percentage of content items that are tagged Not Safe For Work; and
a percentage of views with less than a threshold percentage of completion.

3. The method of claim 1, wherein the user interactions with the plurality of content items include at least one of:
commenting on one or more content items of the plurality of content items by users of the digital magazines;
sharing universal resources locators (URLs) of one or more content items of the plurality of content items among the users of the digital magazines;
accessing one or more content items of the plurality of content items;
flipping, dragging or resizing a page presenting one or more content items of the plurality of content items in a digital magazine; and
expressing a preference for a content item of the plurality of the content items.

4. The method of claim 1, wherein the first trained domain classier is a classifier trained using random forest technique to generate the first prediction of the identified domain being a spam domain, the second trained domain classifier is a classifier trained using logistic regression technique to generate the second prediction of the identified domain being a spam domain, and the third trained domain classier is a classifier trained using naïve Bayes technique to generate the third prediction of the identified domain being a spam domain.

5. The method of claim 1, wherein the plurality of domain training data include the domain features extracted from the plurality of content items of the digital magazines and domain names having known labels indicating a type of the domain.

6. The method of claim 5, wherein a type of the domain is selected from a group of domain types consisting of: spam domain, unlabeled domain, major partner domain, minor partner domain, and whitelisted domain.

7. The method of claim 1, further comprising:
adaptively selecting content items for publishing on the digital magazines from sources identified by corresponding domains based on domain scores of the corresponding domains; and
presenting the selected content items on the digital magazines.

8. The method of claim 7, wherein adaptively selecting content items from sources identified by corresponding domains comprises:
responsive to a domain having a domain score lower than a first threshold, blocking content items provided by a source identified by the domain; and
responsive to a domain having a domain score higher than a second threshold, increasing number of content items for publishing from a source identified by the domain.

9. A non-transitory computer-readable storage medium storing executable computer program instructions, the computer program instructions when executed by a computer processor cause the computer processor to:
receive a plurality of content items of digital magazines and user interactions with the plurality of content items;
obtain domain features from the plurality of content items, a domain feature of a content item related to a domain identifying a source of the content item;
identify one or more domains based on the obtained domain features;
for each identified domain, generate a domain score based on a plurality of predictions of the identified domain by a plurality of trained domain classifiers, a prediction of a domain indicating a likelihood that the domain is a spam domain, and a domain score for a domain indicating a domain-level quality of content items provided by a source identified by the domain, generating the domain score comprising:
applying a first trained domain classifier to a plurality of domain training data;
generating a first prediction of the identified domain being the spam domain;
applying a second trained domain classifier to the plurality of domain training data;
generating a second prediction of the identified domain being the spam domain;
applying a third trained domain classifier to the plurality of domain training data;
generating a third prediction of the identified domain being the spam domain;
generating an aggregate prediction based on the first prediction, the second prediction and the third prediction of the identified domain being a spam domain;
generating a confusion score of the identified domain based on standard deviation of the first prediction, the second prediction and the third prediction of the identified domain being a spam domain; and
generating the domain score for the identified domain based on the aggregate prediction of the identified domain and the confusion score of the identified domain; and
rank the identified domains based on domains scores associated with the identified domains.

10. The computer-readable storage medium of claim 9, wherein the domain features from the plurality of content items comprise at least one of:
average click through rate of the plurality of content items;
average length of the plurality of content items;
a ratio of likes to dislikes of the content items expressed by users of the plurality of content items;
a percentage of content items that are tagged Not Safe For Work; and
a percentage of views with less than a threshold percentage of completion.

11. The computer-readable storage medium of claim 9, wherein the user interactions with the plurality of content items include at least one of:
   commenting on one or more content items of the plurality of content items by users of the digital magazines;
   sharing universal resources locators (URLs) of one or more content items of the plurality of content items among the users of the digital magazines;
   accessing one or more content items of the plurality of content items;
   flipping, dragging or resizing a page presenting one or more content items of the plurality of content items in a digital magazine; and
   expressing a preference for a content item of the plurality of the content items.

12. The computer-readable storage medium of claim 9, wherein the first trained domain classier is a classifier trained using random forest technique to generate the first prediction of the identified domain being a spam domain, the second trained domain classifier is a classifier trained using logistic regression technique to generate the second prediction of the identified domain being a spam domain, and the third trained domain classier is a classifier trained using naïve Bayes technique to generate the third prediction of the identified domain being a spam domain.

13. The computer-readable storage medium of claim 9, wherein the plurality of domain training data include the domain features extracted from the plurality of content items of the digital magazines and domain names having known labels indicating a type of the domain.

14. The computer-readable storage medium of claim 13, wherein a type of the domain is selected from a group of domain types consisting of: spam domain, unlabeled domain, major partner domain, minor partner domain, and whitelisted domain.

15. The computer-readable storage medium of claim 9, further comprising:
   adaptively selecting content items for publishing on the digital magazines from sources identified by corresponding domains based on domain scores of the corresponding domains; and
   presenting the selected content items on the digital magazines.

16. The computer-readable storage medium of claim 15, wherein adaptively selecting content items from sources identified by corresponding domains comprises:
   responsive to a domain having a domain score lower than a first threshold, blocking content items provided by a source identified by the domain; and
   responsive to a domain having a domain score higher than a second threshold, increasing number of content items for publishing from a source identified by the domain.

* * * * *